US012468990B2

(12) United States Patent
Brosnan et al.

(10) Patent No.: US 12,468,990 B2
(45) Date of Patent: Nov. 11, 2025

(54) AUDITING PURCHASING SYSTEM

(71) Applicant: Toshiba Global Commerce Solutions Holdings Corporation, Tokyo (JP)

(72) Inventors: Susan W. Brosnan, Raleigh, NC (US); Jessica Snead, Cary, NC (US); Patricia S. Hogan, Raleigh, NC (US); Daniel R. Goins, Wake Forest, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 220 days.

(21) Appl. No.: 17/698,922

(22) Filed: Mar. 18, 2022

(65) Prior Publication Data
US 2023/0297905 A1    Sep. 21, 2023

(51) Int. Cl.
*G06Q 10/0631* (2023.01)
*G06Q 20/20* (2012.01)
*G06V 10/764* (2022.01)

(52) U.S. Cl.
CPC ..... *G06Q 10/06311* (2013.01); *G06Q 20/208* (2013.01); *G06V 10/764* (2022.01)

(58) Field of Classification Search
CPC .......... G06Q 10/06311; G06Q 20/208; G06V 10/764; G06V 10/70; G06V 20/52
See application file for complete search history.

(56) References Cited

U.S. PATENT DOCUMENTS

| | | |
|---|---|---|
| 5,965,861 A | 10/1999 | Addy et al. |
| 7,516,888 B1 | 4/2009 | Kundu et al. |
| 7,909,248 B1 * | 3/2011 | Goncalves ........... G07G 1/0072 235/462.14 |
| 8,104,680 B2 * | 1/2012 | Kundu .................. G06Q 20/00 235/383 |
| 8,448,859 B2 * | 5/2013 | Goncalves ........... G07G 1/0054 235/383 |
| 10,311,459 B1 * | 6/2019 | Babao ................ G06Q 30/0267 |
| 11,100,331 B2 * | 8/2021 | Pricochi ............... G06V 40/107 |
| 11,775,952 B2 * | 10/2023 | Crooks .................... G06K 7/14 705/23 |
| 11,798,380 B2 * | 10/2023 | Brakob ................ G06V 10/255 |

(Continued)

FOREIGN PATENT DOCUMENTS

EP    3525151 A1    8/2019

OTHER PUBLICATIONS

Bobbit, Russell, et al. "Visual item verification for fraud prevention in retail self-checkout." 2011 IEEE Workshop on Applications of Computer Vision (WACV). IEEE, 2011. (Year: 2011).*

(Continued)

*Primary Examiner* — Nathan A Mitchell
(74) *Attorney, Agent, or Firm* — Patterson + Sheridan, LLP; Gero G. McClellan

(57) ABSTRACT

Techniques for auditing purchases are provided. An item for purchase is scanned to determine a first identity of the item. The scanned item is added to a transaction. A first image of the scanned item is captured using a first camera. A second identity of the scanned item from the first image is determined using a trained machine learning (ML) model. Responsive to determining the first and second identities of the item do not match, an audit of the transaction is performed.

15 Claims, 5 Drawing Sheets

(56) References Cited

U.S. PATENT DOCUMENTS

| | | | |
|---|---|---|---|
| 2003/0122667 A1* | 7/2003 | Flynn | G08B 13/19689 340/572.1 |
| 2009/0060259 A1* | 3/2009 | Goncalves | A47F 9/047 382/100 |
| 2009/0272801 A1* | 11/2009 | Connell, II | G06Q 10/087 235/383 |
| 2016/0292661 A1* | 10/2016 | Kwan | H04N 7/181 |
| 2019/0327451 A1* | 10/2019 | Takeno | G06V 20/41 |
| 2020/0085214 A1* | 3/2020 | Patil | G06N 20/00 |
| 2020/0143130 A1* | 5/2020 | Costello | G06T 7/12 |
| 2021/0049400 A1* | 2/2021 | Scott | G06K 7/1443 |
| 2021/0158354 A1* | 5/2021 | Apps | G06K 7/1417 |
| 2023/0004978 A1* | 1/2023 | Brakob | G07G 3/003 |
| 2023/0005342 A1* | 1/2023 | Brakob | G06V 20/52 |
| 2023/0030507 A1* | 2/2023 | Migdal | G06Q 30/018 |
| 2023/0037427 A1* | 2/2023 | Brakob | G06Q 20/208 |
| 2023/0124756 A1* | 4/2023 | Trim | G07G 1/0063 705/23 |
| 2023/0162576 A1* | 5/2023 | Takeno | G06V 20/52 348/150 |
| 2023/0177391 A1* | 6/2023 | Packwood | G06V 20/52 706/12 |
| 2023/0186601 A1* | 6/2023 | Hartley | G06K 7/1447 382/103 |

OTHER PUBLICATIONS

© 2016 StopLift Checkout Vision Systems, "Prevent Checkout Theft, Sweathearting, Basket-based loss, and operational errors", retrieved Mar. 17, 2022, 8 pages <https://www.stoplift.com/>.

* cited by examiner

AUDITING PURCHASING SYSTEM

BACKGROUND

Conventionally, when stores need to audit customers and their purchases, an employee is stationed at an exit to manually check customers' receipts. However, this leads to various problems. For one, it is a slow process, which leads to a bottleneck of customers attempting to leave the store. Customers get backed up, leading to increased frustrations. Additionally, customers may feel as though they are unfairly being targeted, when in reality, the store is simply attempting to verify purchases. Some systems have been developed to monitor customers in stores. However, these systems are not easily implemented in stores. For example, these systems may use high resolution cameras or very expensive systems to look at every item the customers are purchasing. These high resolution cameras are not commonly owned in all stores, and smaller retailers are not able to implement these existing systems.

DETAILED DESCRIPTION

Embodiments of the present disclosure provide techniques for auditing customers' purchases. As stated above, conventional techniques lead to frustration of customers. Additionally, the existing systems are not easily implementable in all stores. For example, existing systems are expensive and require the use of high resolution cameras, which are not common to have in all stores. Additionally, smaller retailers are not able to upgrade to utilize these system, as the cost and requirements are too significant.
Advantages of Using Computer Vision to Identify Items Current technical solutions fail to provide techniques to match items listed on a receipt or transaction to the physical items in the shopper's possession. This failure leads to an inability to audit customer purchases. The present disclosure provides for an improvement to a specific technology of computing systems in self-service lanes. These improved computing systems have computer vision able to identify items and match them to a transaction listing on a receipt. This computer vision may be implemented using the use of systems already available in the stores. Even if stores do not have systems in place, they can be added relatively easily. For instance, the present disclosure provides for use of lower resolution cameras that are more common and easier to be implemented in smaller retailers. Many stores already have cameras installed. For example, security cameras may be present throughout the store. These cameras may, perhaps, be in self-service lanes.

In this disclosure, reference is made to "Generic-Os" and "Brand-Os." These are two brands of cereal: Generic-Os being the generic brand, Brand-Os being the name brand (which is more expensive than the generic brand). These should just be construed as examples of products.

Figure 1:
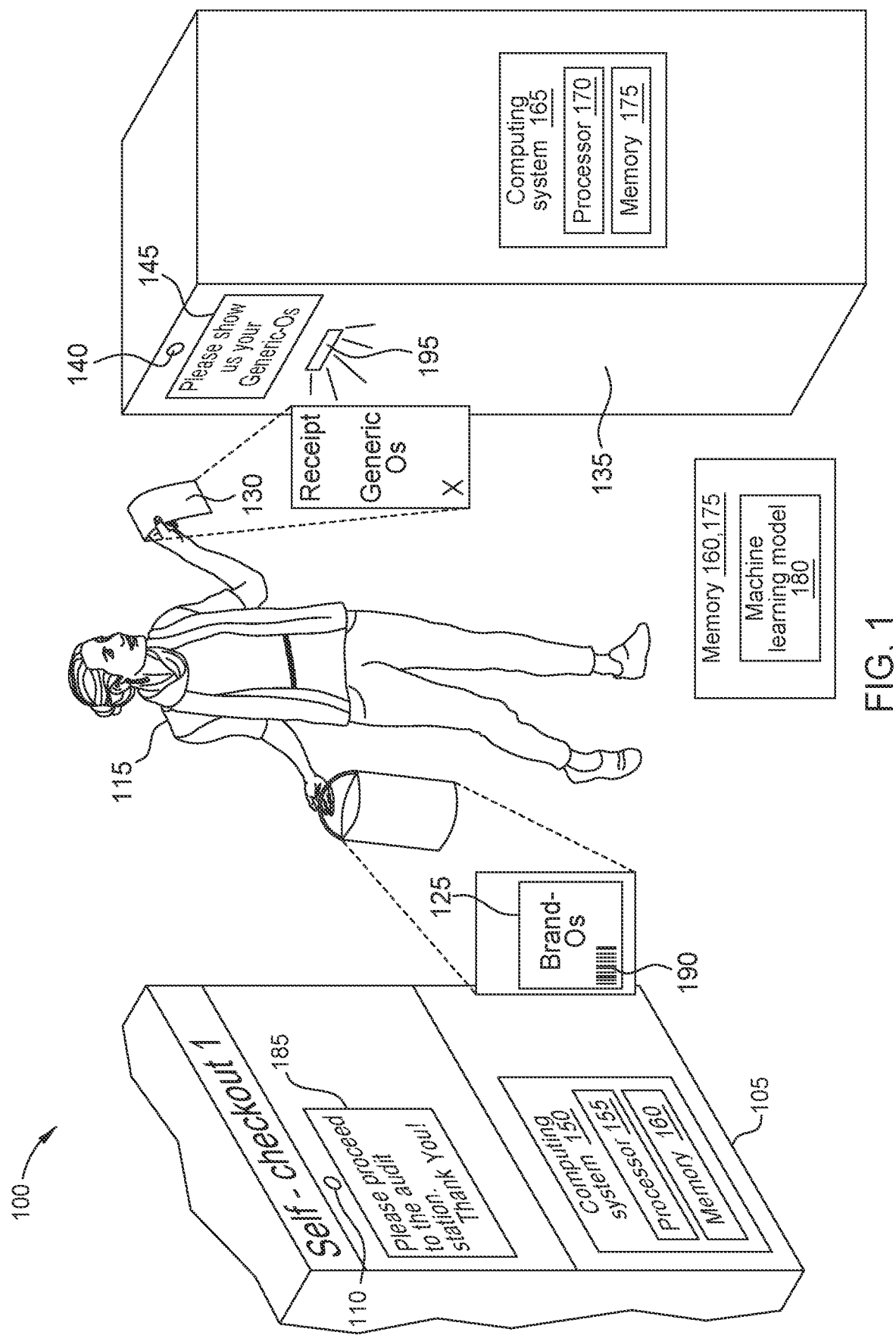
FIG. 1 depicts a first example environment, according to one embodiment.

With reference now to FIG. 1, a first example environment 100 is depicted. In one embodiment, this example environment may be a self-service lane at a grocery store. The self-service lane is comprised of a self-service kiosk 105 (or self-checkout kiosk). The self-service kiosk 105 has a camera 110. The camera 110 monitors a customer 115, when she is checking out at the self-service kiosk 105 using, for example a bar code scanner (not shown). The camera 110 takes pictures of the items being scanned. The self-service kiosk 105 determines if there is a discrepancy between what the camera 110 is monitoring and what is being scanned and added to the transaction, which is listed on a receipt 130.

The self-service kiosk 105 has various components such as the computing system 150 which has a processor 155 and memory 160. The memory 160 contains a machine learning (ML) model 180. The ML model may be executed locally on a user's device, within a store's computing system, or in the cloud. In one embodiment, the ML model 180 is trained with images of a store's products. In one embodiment, the training of the ML model 180 is done actively. In one embodiment, the training of the ML model 180 is done asynchronously. The trained ML model 180 learns from the images being fed to it by understanding what the items look like.

Following along with the example of customer 115, customer 115 has checked out and has one item in her bag 120—e.g., Brand-Os 125. The camera 110 has monitored customer 115 and has preliminarily determined, using the ML model 180, that she has put Brand-Os in her bag. In one embodiment, the customer 115 nefariously placed a barcode 190 from the Generic-Os over the barcode on the Brand-Os. For this reason, the bar code reader at the self-service kiosk 105 reads the barcode 190 for Generic-Os. The receipt 130 indicates that she scanned and purchased Generic-Os. In one embodiment, because there is a discrepancy in what the camera 110 has determined the product is (e.g., Brand-Os) as determined by the ML model 180 versus what has been scanned at the self-service kiosk 105 (e.g., Generic-Os) using the bar code, the receipt 130 has an indication that there is a discrepancy. In one embodiment, the indication is a tick-mark on the receipt 130.

In one embodiment, the customer 115 is prompted by the screen 185 on the self-service kiosk 105 to proceed to the audit station 135 after scanning all of her items and completing her transaction. For example, after completing her transaction, the self-service kiosk 105 presents, to the customer 115, the message, "Please proceed to the audit station. Thank you!" Due to this prompt, the customer 115 goes to the audit station 135. The audit station 135 has various components, including the computing system 165. The computing system 165 has a processor 170 and memory 175. The memory 175 contains the ML model 180, which may be the same ML model 180 used by the self-service kiosk 105.

At the audit station 135, the screen 145 presents the customer 115 with which item(s) was determined to have a discrepancy between what the camera 110 saw versus what the receipt 130 says. For example, the screen 145 presents the message, to the customer 115, the message, "Please show us your Generic-Os!" The customer 115 then takes her Brand-Os out of the bag and holds them up to the audit station 135. The audit station 135 has a camera 140, which is able to monitor what the customer 115 holds up. In this example, the customer 115 holds up her Brand-Os. Using the ML model 180, the audit station 135 determines that there truly is a discrepancy between what was scanned and what the customer 115 scanned. Because this audit station confirmed the discrepancy, an employee, not pictured in FIG. 1, may be notified.

However, in one embodiment, the customer 115 may truly have Generic-Os. The self-service kiosk 105 may have made an error with determining there was a discrepancy. In one embodiment, the camera 110 is low resolution. Because it is low resolution, it may not be able to get a good picture of the item the customer 115 scanned. The customer 115 is prompted to proceed to the audit station 135. At the audit station 135, the customer 115 holds up her Generic-Os that she purchased. The camera 140 detects that it truly is Generic-Os, which matches with the receipt 130. For example, the camera 140 may be a higher quality camera, or may be able to capture a better image of the Generic-Os (e.g., there is no occlusion or a better viewing angle). In one embodiment, the screen 145 presents the message, "Thank you for shopping with us!" No notification is needed, as no nefarious action was taken. The camera 110 simply did not take an image that was quality enough to correctly identify the product.

In another embodiment, each customer checking out in the self-service lane is required to scan her receipt at the audit station 135. The audit station 135 has a scanner 195 on it that receipts can be scanned at. In one embodiment, assume the customer 115 is acting nefariously and attempting to purchase Brand-Os at the Generic-Os' price by covering the bar code on the Brand-Os with the bar code of the Generic-Os. The receipt 130 has an indication (e.g., a tick-mark) that identifies there is a possible discrepancy. The scanner 195 determines if a receipt includes an indication. Because the scanner 195 determines this, the receipt 130 including the indication is flagged. This prompts the customer 115 to take part in the audit process, as described above. In one embodiment, a customer has a receipt that does not have any indication. In this case, the audit station 135 displays a "thank you" message, as described above, and the customer 115 proceeds out of the store.

In yet another embodiment, each customer checking out in the self-service lane is required to go to the audit station 135 after completing her transaction. In this embodiment, even if no discrepancy is found, the customers are required to proceed to the audit station and complete and audit on their items. Each customer scans her receipt at the scanner 195. The audit station 135 picks one item to verify from the customer's receipt. For example, a customer may have purchased a can of beans and a bag of carrots. The audit station 135 may prompt the customer to present the can of beans, bag of carrots, or both to the audit station 135. The camera 140 detects the item being held up by the customer, and using the ML model 180, the audit station 135 determines if the image from the camera 140 matches the image the ML model was trained with. If it is a match, the customer is prompted with a "thank you" message. If is it not a match, an employee is notified to take further action.

Some stores may not have a bag system, and all items are placed in a cart after the transaction is completed. In this embodiment, the camera 110 can be arranged to take a picture of the cart. The self-service kiosk 105 circles an item that should be verified. That is, the self-service kiosk 105 can use the ML model 180 to identify each item in the cart and ensure they match an item on the receipt. Identified items that do not match the receipt can be circled. In one embodiment, the self-service kiosk 105 displays the picture with the circled item. The customer is prompted to hold up the item that is circled. If the ML model 180 determines the item held up matches the item that was scanned, the customer is prompted with a "thank you" message and can proceed out of the store. If it is not a match, an employee is notified to take further action.

In one embodiment, the self-service kiosk 105 transmits the picture with the circled item to the audit station 135. The customer is prompted to proceed to the audit station 135. The screen 145 displays the transmitted picture with the circled item. The customer is prompted to hold up the item that is circled. The camera 140 detects what item is being held up, and the audit station 135 determines, using the ML model 180, whether the circled item matches the item that was scanned. If it is a match, the customer is prompted with a "thank you" message and can proceed out of the store. If it is not a match, an employee is notified to take further action.

In one embodiment, the store pre-selects items to audit. Anytime a customer scans one of these items, the customer will be prompted to proceed to an audit station. For example, the store has pre-selected item A to always require an audit. When a customer is at a self-service kiosk, even if there is no discrepancy determined between A's barcode scan and A's picture, the customer is prompted to go to the audit station. The customer should proceed to the audit station and participate in an audit, as described above.

One embodiment allows for a time stamp of when the item was scanned to be matched with a time stamp of when the photo was taken of the item. This time stamp comparison is used to further determine which image to compare with which scan.

Using the audit station 135 as described above helps with reducing the backup of customers as they exit the store. However, the same auditing processes performed by the audit station 135 can instead be performed by the self-service kiosk 105. That is, the embodiments herein are not limited to having a separate auditing station for one or more self-service kiosks, and instead, the self-service kiosks can perform the auditing processing using their cameras 110.

Figure 2:
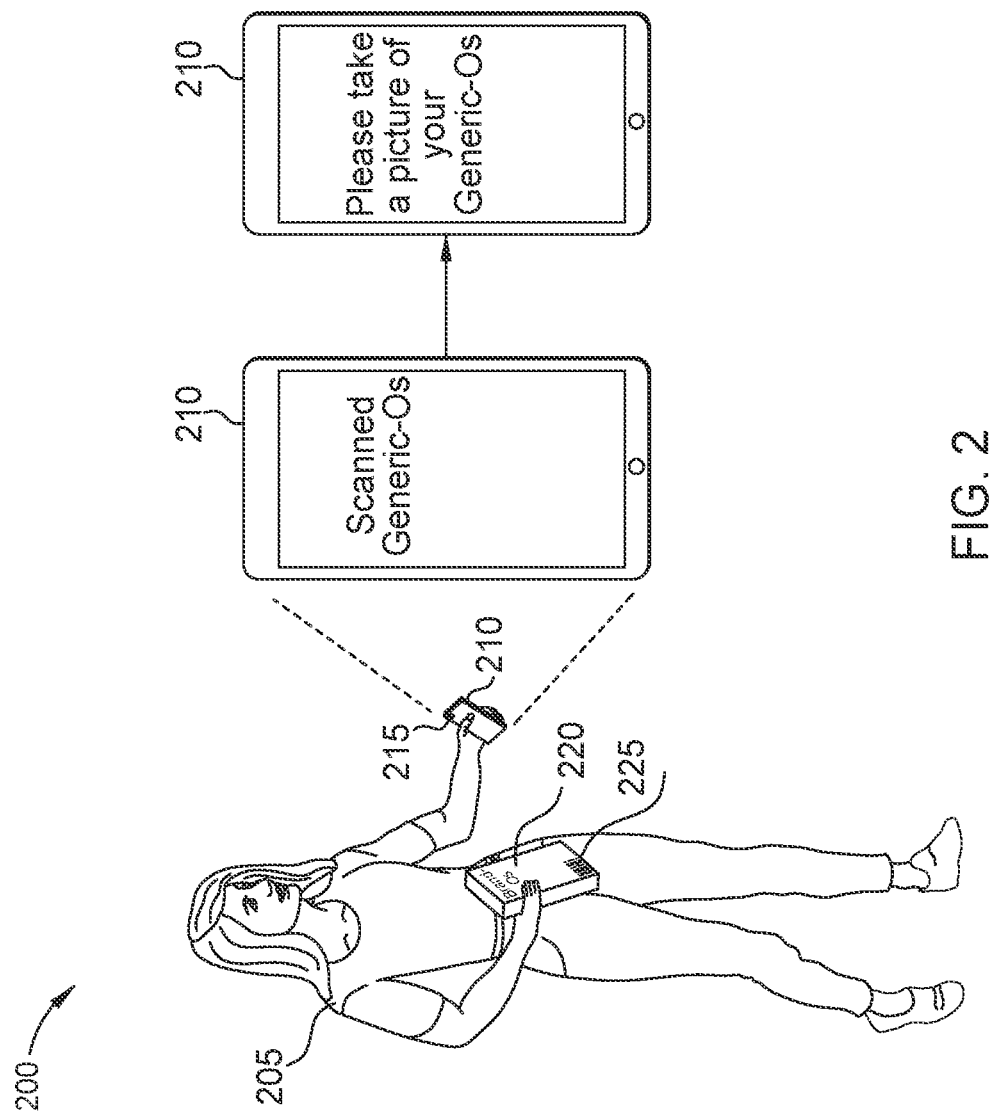
FIG. 2 depicts a second example environment, according to one embodiment.

FIG. 2 depicts a second example environment 200, according to one embodiment. In one embodiment, the second example environment is in a store of a customer 205 participating in a mobile shopping experience. Customer 205 uses her mobile device 210 to do the mobile shopping. In one embodiment, the mobile shopping takes place through an application on the mobile device 210. The mobile device 210 has a camera 215. The camera 215 scans a product's barcode and takes an image of the product.

In one embodiment, the customer 205 is purchasing a box of cereal. The product the customer 205 has picked up is Brand-Os 220. It is assumed the packaging of the Brand-Os has a barcode but in this embodiment, the customer 205 is a nefarious actor who has placed a Generic-Os barcode 225 over the Brand-Os barcode.

The customer 205 scans the barcode 225 which triggers the system to identify the box of cereal as Generic-Os rather than Brand-Os. The camera 215 on the mobile device 210 scans the barcode 225 and also takes a picture of the Brand-Os 220. The mobile device 210, after the barcode 225 is scanned, displays a message, for example, reading "Generic-Os scanned."

Using the ML model 180, as discussed with reference to FIG. 1, the application on the mobile device 210 detects whether the barcode that was scanned matches the barcode associated with that item. In one embodiment, the application on the mobile device 210 determines whether the barcode 225 matches the image of the Brand-Os 220, which was captured by the camera 215. Because image captured of the Brand-Os 220 do not match with the barcode 225, which scans as Generic-Os, the application on the mobile device 210 determines there is a need to further examine the product that was scanned. In one embodiment, the application on the mobile device 210 displays a message prompting the customer 205 to show the product, associated with the barcode, again to the camera 215. For example, the mobile device 210 may display a message reading, "Please take a picture of your Generic-Os that captures the entire packaging." In this instance, the customer 205 will hold up her Brand-Os 220. The application on the mobile device 210 determines there is in fact a discrepancy between the barcode 225 and the Brand-Os 220. Because of this discrepancy, an employee can be notified to take further action.

In one embodiment, however, the customer 205 may truly have Generic-Os, rather than Brand-Os, and the application on the mobile device 210 incorrectly identified a discrepancy between what was scanned and what item the camera 215 monitored. In this scenario, the customer 205 scans the barcode on the Generic-Os, and the camera 215 takes a picture of the item. For some reason, the application on the mobile device 210 preliminarily determines that the barcode and the item are not a match. One example may be where a portion of the item was in the camera's field of vision, and the camera 215 did not get a complete picture of the item which led to the ML model 180 misidentifying the item. The customer is then prompted, over the application on the mobile device 210, to take a picture of the entire item (e.g., its front side) using the mobile device 210. Because the picture may be more focused or includes the entire item, the ML model 180 can now correctly identify the item as Generic-Os and the application determines there is not a discrepancy, and no further action is needed. In one embodiment, the screen on the mobile device 210 displays a message that the item has been added to the customer's transaction.

In one embodiment, the customer 205 may truly have Generic-Os, rather than Brand-Os, and the application on the mobile device 210 correctly identified a match between what was scanned and what item the camera 215 monitored. In this scenario, there is no discrepancy, and no further action is needed. In one embodiment, the screen on the mobile device 210 displays a message that the item has been added to the customer's transaction.

In one embodiment, the store has pre-selected items to audit. Anytime a customer scans one of these items, the customer will be prompted to proceed to participate in an audit over a mobile device. For example, the store has pre-selected item A to always require an audit. When a customer is using the mobile shopping application and scans A, the mobile shopping application prompts the customer to participate in an audit, as described above.

Figure 3:
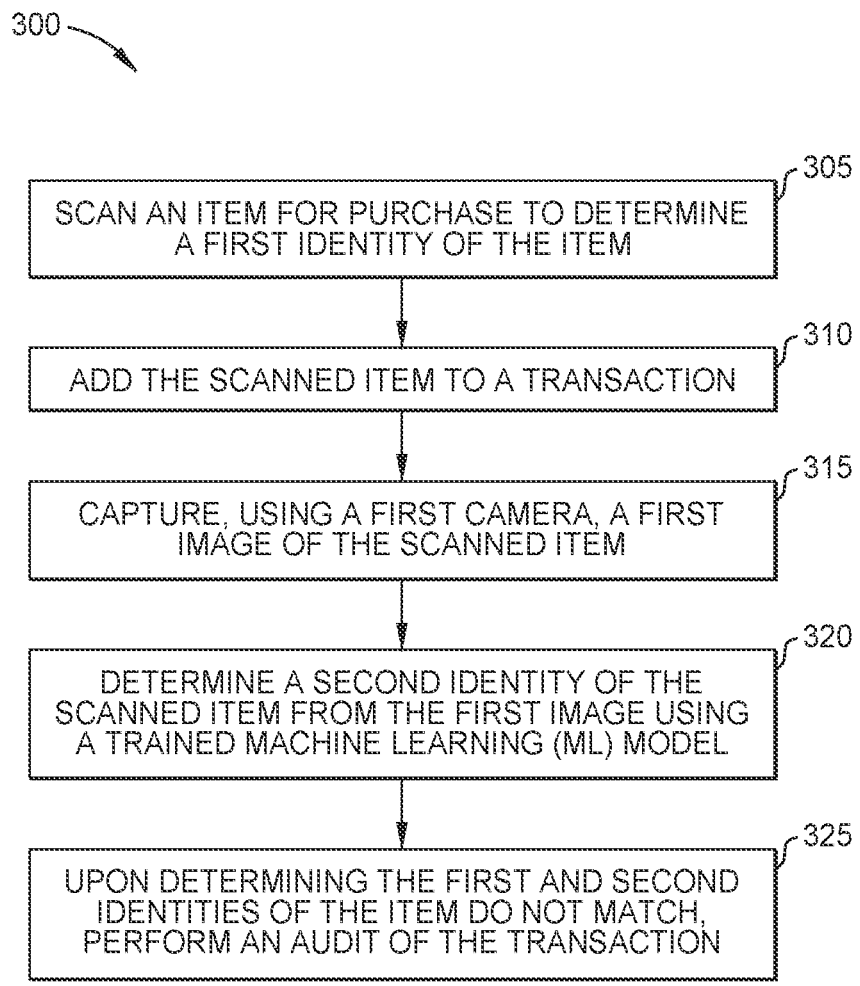
FIG. 3 is a flow diagram illustrating a method for auditing customer purchases.

FIG. 3 is a flow diagram illustrating a method 300 for auditing customer purchases.

At block 305, the system scans an item for purchase to determine a first identity of the item. In one embodiment, the system may be the self-service kiosk. For example, a customer may scan her Brand-Os at the self-service kiosk. In another embodiment, the system is an application on the customer's mobile device At block 310, the system adds the scanned item to a transaction. In one embodiment, the transaction can be listed on a receipt. For example, after the customer scans her Brand-Os, the transaction will include the Brand-Os, which will ultimately list the item on her receipt.

At block 315, the system captures, using a first camera, a first image of the scanned item. In one embodiment, the first camera is located on the self-service kiosk. In another embodiment, the first camera is on a customer's mobile device.

At block 320, the system determines a second identity of the scanned item from the first image using a trained machine learning (ML) model. In one embodiment, the trained ML model is the ML model discussed with reference to FIGS. 1 and 2.

At block 325, upon determining the first and second identities of the item do not match, the system performs an audit of the transaction. In one embodiment, the audit may take place at the self-service kiosk. In another embodiment, the audit may take place at an audit station. In another embodiment, the audit may take place over an application on a customer's mobile device.

In some aspects, the techniques further comprise training the ML model, wherein training the ML model further comprises: inputting a plurality of images for a training item, wherein the plurality of images are used to train the ML model to recognize the training item.

In some aspects, performing an audit of the transaction comprises: capturing, using a second camera, a second image of the scanned item; determining a third identify of the scanned item from the second image using a second trained ML model; and determining whether the first identify matches the third identity.

In some aspects, performing an audit of the transaction further comprises: upon determining the first identify and the third identity do not match, notifying an employee.

In some aspects, performing an audit of the transaction further comprises: capturing, using the first camera, a second image of the scanned item; determining a third identify of the scanned item from the second image using a second trained ML model; determining whether the first identify matches the third identity; and upon determining the first identify and the third identity do not match, notifying an employee to take further action.

In some aspects, the scan takes place at one of the following: a self-service kiosk or a mobile shopping application.

In some aspects, the audit takes place at one of the following: a self-service kiosk, an audit station, or a mobile shopping application.

In some aspects, the audit takes place at the audit station, the first camera is located on the self-service kiosk, and a second camera is located on the audit station.

Figure 4:
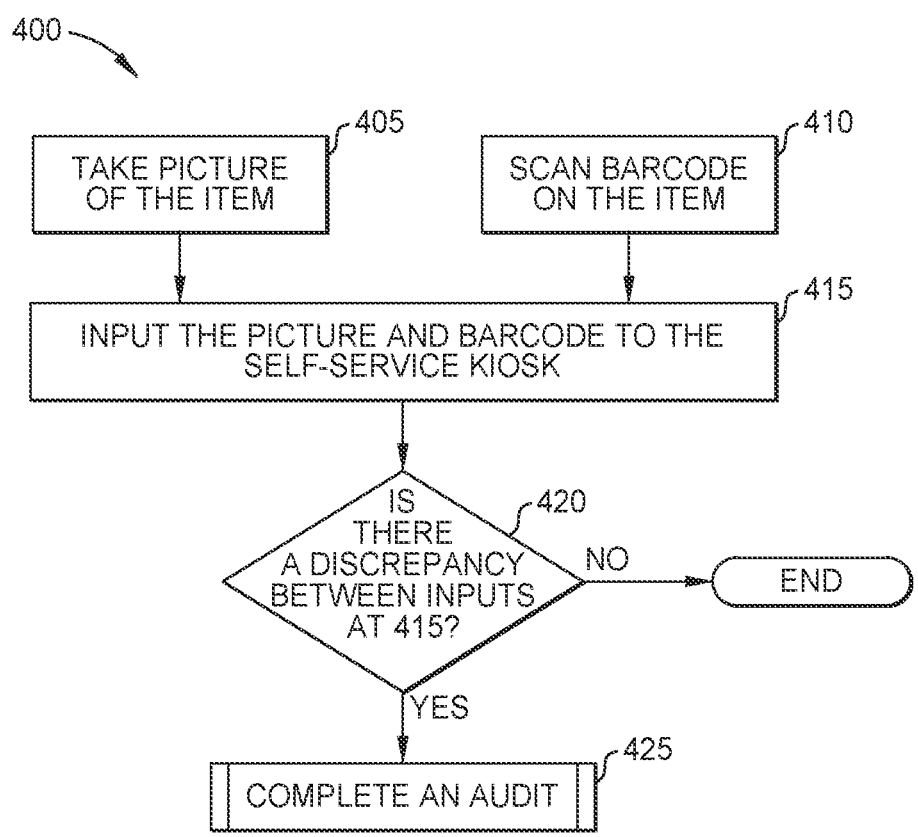
FIG. 4 is a flow diagram illustrating a method for determining to audit a customer's purchase.

FIG. 4 is a flow diagram illustrating a method 400 for auditing customer purchases. At block 405, a camera takes a picture of an item. In one embodiment, the picture is taken with the camera 110 of FIG. 1 or camera 215 of FIG. 2. The camera 110 may already be present in the store and may not be high resolution. Because of this, the picture that is taken may not be clear.

At block 410, a customer scans a barcode on the item. In one embodiment, the scan is done from a self-service kiosk 105 of FIG. 1 or camera 215 of FIG. 2. Although barcodes are used as the primary example throughout this description, it should be understood that the disclosure is not limiting to scanning barcodes. For example, RFID tags can be used. In that case, the RFID tags can be disposed on the items for purchase and are read at the self-service kiosk 105 having an RFID reader to identify the item.

At block 415, the self-service kiosk receives both the picture and scanned barcode of the item are received as inputs. In one embodiment, the ML model 180 is used to recognize objects in the picture. Using the ML model 180, a determination can be made about what item (or items) is in the picture captured at the self-service kiosk. As mentioned above, the ML model can previously be trained to recognize items being sold at the store.

At block 420, the self-service kiosk 105 determines whether there is a discrepancy between the inputs of block 415. That is, the self-service kiosk 105 can receive from the ML model 180 its identification of the item using the picture. If the identification generated by the ML model 180 matches the identification resulting from scanning the barcode, this means there is no discrepancy. If there is no discrepancy, the method 400 ends. However, if there is a discrepancy where the identifications provided by the ML model 180 and the scanned barcode do not match, the method proceeds to block 425.

At block 425, an auditor, which may be audit station 135, completes an audit for the item. This will be explained in further detail below, with reference to FIG. 5.

Figure 5:
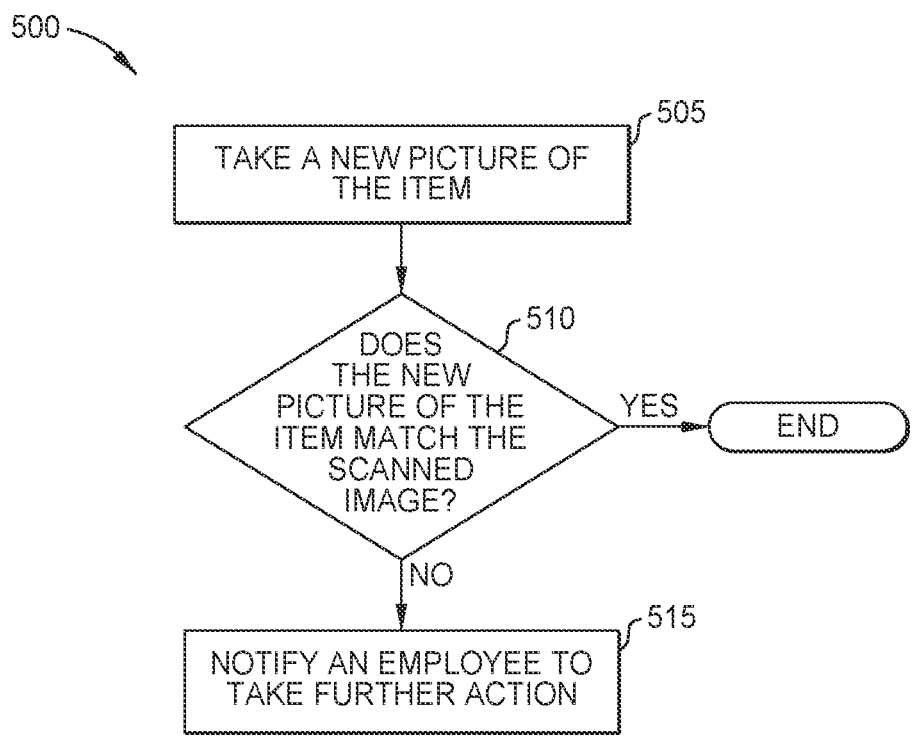
FIG. 5 is a flow diagram illustrating a method for performing an audit of a customer's purchase.

FIG. 5 is a flow diagram illustrating a method 500 for performing an audit of a customer's purchase. In one embodiment, the method is completed at block 425 of FIG. 4.

At block 505, a camera takes a new picture of the item. In one embodiment, this is done by the camera 110 or 140 of FIG. 1 or by the camera 215 of FIG. 2. This new picture is taken in order to further determine if the correct item was previously scanned. In one embodiment, the camera used at block 505 is of higher resolution than the camera used at block 405 of FIG. 4. The use of a higher resolution camera allows for a higher quality picture of the item to be taken. However, this is not necessary since the camera used to capture an image of the item at block 405 can have the same resolution as the camera used to capture an image of the item at block 505. Because the image captured at block 405 may be occluded by the user, capture just a portion of the item, or capture the item at a poor angle, the image captured at block 505 when the customer is being prompted to explicitly hold the item in front of the camera may result in a more optimal image for the ML model to process.

At block 510, the trained ML model determines whether the picture of the item matches with the scanned item. In one embodiment, the trained ML model is the same ML model 180 used in the method 400 to identify the item at block 420. However, in other embodiments, the auditing process may use a different ML model to identify the item, which may be more accurate but require more time to identify the item. The way the ML models can be trained will be discussed with further detail below, with reference to FIG. 6.

If, at block 510, it is determined it is a match, the method 500 ends since the auditing process has determined the physical item matches the item on the transaction or receipt. However, if there is a discrepancy and no match, the method proceeds to block 515.

At block 515, an employee is notified. This way, the employee, or the store, can take further action such as manually inspecting the items and comparing them to the shopper's receipt.

Figure 6:
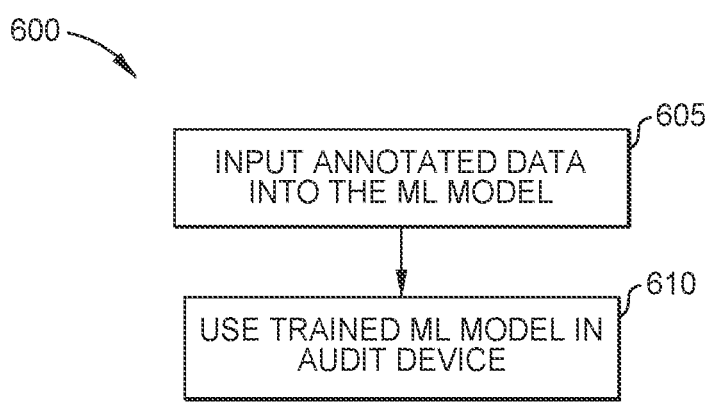
FIG. 6 is a flow diagram illustrating a method for training an ML model.

FIG. 6 is a flow diagram illustrating a method 600 for training an ML model. In one embodiment, the ML model corresponds to the ML model 180, as discussed with reference to FIG. 1.

At block 605, annotated data is inputted into the ML model. This annotated data is labelled data corresponding to items. For example, the ML model may be fed various images of one item (e.g., Brand-Os). The ML model is trained, using these images, what Brand-Os look like. The trained ML model can then predict whether new images of an item are Brand-Os. This training can be completed for multiple items.

This training may be done actively, or it may be asynchronously. In other words, the ML model can be continuously trained over time or trained prior to its use in the computing system. Further, as a store adds new items to its inventory, the ML model can be retrained to recognize these items.

At block 610, the trained ML model can be used in an audit device. That is, the trained ML model can be used at block 420 of FIG. 4 to initially identify items to detect a discrepancy and at block 510 after a discrepancy has been detected. In one embodiment, the audit device is the self-service kiosk 105 or audit station 135 in FIG. 1 or mobile device 210 in FIG. 2.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   receiving an item for purchase;
   determining a first identity of the item for purchase;
   adding the item for purchase to a transaction;
   receiving, from a first camera located on a self-service kiosk, a first image of the item for purchase captured from the first camera;
   determining a second identity of the item for purchase from the first image using a trained machine learning (ML) model; and
   responsive to determining the first and second identities of the item for purchase do not match, executing an audit of the transaction at an audit station, wherein executing the audit of the transaction comprises:
      generating a set of instructions on the audit station, wherein the set of instructions instruct a user to position the item for purchase in a first position relative to a field of view of a second camera located on the audit station, wherein the second camera is a higher resolution than the first camera;
causing the generated set of instructions to display on a user interface in the field of view of the user;
receiving, from the first camera, a second image of the item for purchase;
determining a third identity of the item for purchase from the second image using a second trained ML model; and
determining that the first identity matches the third identity.

2. The method of claim 1, further comprising training the ML model, wherein training the ML model comprises:
inputting a plurality of images for a training item, wherein the plurality of images are used to train the ML model to recognize the training item.

3. The method of claim 1, wherein the audit of the transaction further comprises:
responsive to determining the first identity and the third identity do not match, notifying an employee.

4. The method of claim 1, wherein the audit of the transaction comprises:
prompting the user to show the item for purchase again to the first camera,
responsive to determining the first identity and the third identity do not match, notifying an employee to take further action.

5. The method of claim 1, wherein receiving the item for purchase takes place at one of the following: the self-service kiosk or a mobile shopping application.

6. A system, comprising:
one or more computer processors; and
a memory containing a program which when executed by the one or more computer processors performs an operation, the operation comprising:
receiving an item for purchase;
determining a first identity of the item for purchase;
adding the item for purchase to a transaction;
receiving, from a first camera located on the system, a first image of the item for purchase captured from the first camera;
determining a second identity of the item for purchase from the first image using a trained machine learning (ML) model; and
responsive to determining the first and second identities of the item for purchase do not match, executing an audit of the transaction at an audit station, wherein executing the audit of the transaction comprises:
generating a set of instructions on the audit station, wherein the set of instructions instruct a user to position the item for purchase in a first position relative to a field of view of a second camera located on the audit station, wherein the second camera is a higher resolution than the first camera;
causing the generated set of instructions to display on a user interface in the field of view of the user;
receiving, from the first camera, a second image of the item for purchase;
determining a third identity of the item for purchase from the second image using a second trained ML model; and
determining that the first identity matches the third identity.

7. The system of claim 6, further comprising training the ML model, wherein training the ML model further comprises:
inputting a plurality of images for a training item, wherein the plurality of images are used to train the ML model to recognize the training item.

8. The system of claim 6, wherein the audit of the transaction further comprises:
responsive to determining the first identity and the third identity do not match, notifying an employee.

9. The system of claim 6, wherein the audit of the transaction comprises:
prompting the user to show the item for purchase again to the first camera,
responsive to determining the first identity and the third identity do not match, transmitting a notification to a first mobile device associated with—an employee.

10. The system of claim 6, wherein:
receiving the item for purchase takes place at one of the following: a self-service kiosk or a mobile shopping application.

11. A computer program product for auditing purchases, the computer program product comprising:
a computer-readable storage medium having computer-readable program code embodied therewith, the computer-readable program code executable by one or more computer processors to:
receive an item for purchase;
determine a first identity of the item for purchase;
add the item for purchase to a transaction;
receive, from a first camera located on a self-service kiosk, a first image of the item for purchase capturing from the first camera;
determine a second identity of the item for purchase from the first image using a trained machine learning (ML) model; and
responsive to determining the first and second identities of the item for purchase do not match, execute an audit of the transaction at an audit station, wherein executing the audit of the transaction comprises:
generating a set of instructions on the audit station, wherein the set of instructions instruct a user to position the item for purchase in a first position relative to a field of view of a second camera located on the audit station, wherein the second camera is a higher resolution than the first camera;
causing the generated set of instructions to display on a user interface in the field of view of the user;
receiving, using the first camera, a second image of the item for purchase;
determining a third identity of the item for purchase from the second image using a second trained ML model; and
determining that the first identity matches the third identity.

12. The computer program product of claim 11, wherein the computer-readable program code is further executable to train the ML model, wherein training the ML model further comprises:
inputting a plurality of images for a training item, wherein the plurality of images are used to train the ML model to recognize the training item.

13. The computer program product of claim 11, wherein performing the audit of the transaction further comprises:
responsive to determining the first identity and the third identity do not match, notifying an employee.

14. The computer program product of claim 11, wherein performing the audit of the transaction further comprises:
prompting the user to show the item for purchase again to the first camera, responsive to determining the first identity and the third identity do not match, transmitting a notification to a first mobile device associated with an employee.

15. The computer program product of claim 11, wherein:
receiving the item for purchase takes place at one of the following: h self-service kiosk or a mobile shopping application.

* * * * *